United States Patent [19]

Wahlbeck

[11] 4,073,428
[45] Feb. 14, 1978

[54] METHOD AND APPARATUS FOR CONTINUOUSLY SOLDERING OF CHAINS OF PRECIOUS METALS OR PLATED THEREWITH

[76] Inventor: Hans Gustav Erik Wahlbeck, Nybble, S-150 32 Stallarholmen, Sweden

[21] Appl. No.: 675,229

[22] Filed: Apr. 8, 1976

[30] Foreign Application Priority Data

Apr. 11, 1975 Sweden .............................. 7504197

[51] Int. Cl.² ................................................ B23K 1/00
[52] U.S. Cl. ..................................... 228/178; 228/49; 228/192
[58] Field of Search ................ 228/192, 178, 182, 5.1, 228/6, 38, 43, 44.1, 49, 47, 254; 219/52; 59/35

[56] References Cited

U.S. PATENT DOCUMENTS

| 970,726 | 9/1910 | Kunzmann et al. ................. 228/192 |
| 988,553 | 4/1911 | Dollinger ............................. 228/192 |
| 1,060,062 | 4/1913 | Britsch ................................. 228/192 |
| 1,775,839 | 9/1930 | Wenz et al. .......................... 228/192 |

*Primary Examiner*—Donald G. Kelly
*Attorney, Agent, or Firm*—M. Ted Raptes

[57] ABSTRACT

A method and apparatus are provided for soldering abutting ends of links of chains of precious metals. The soldering is accomplished by applying solder to the abutting ends, continuously feeding the chain onto a rotating surface such as a rotating table, heating the chain to melt the solder, and removing the chain from the table. The chain is fed at a slightly higher rate than the rational speed of the table to cause the links to be pushed into each other to avoid tensions from developing in said links during the heating step.

15 Claims, 2 Drawing Figures

U.S. Patent  Feb. 14, 1978  4,073,428
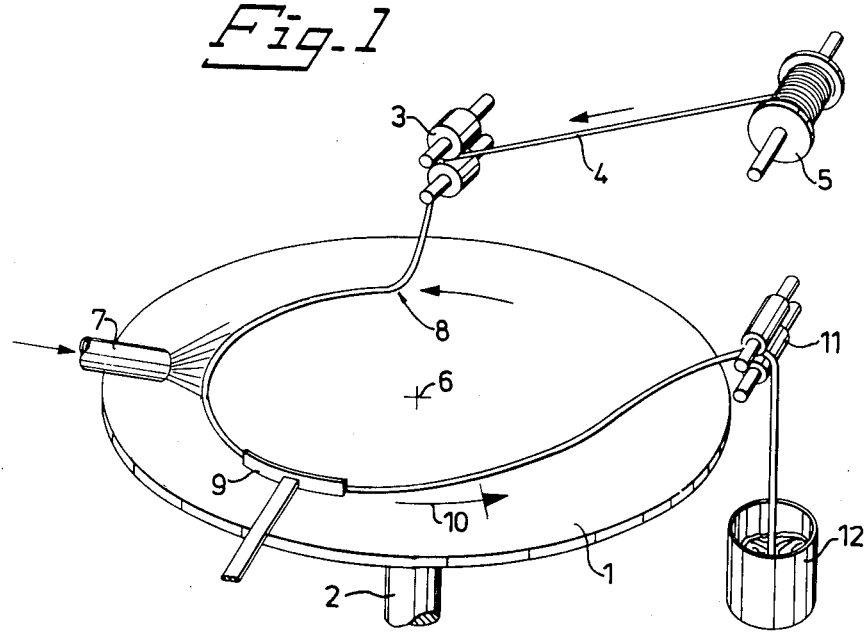
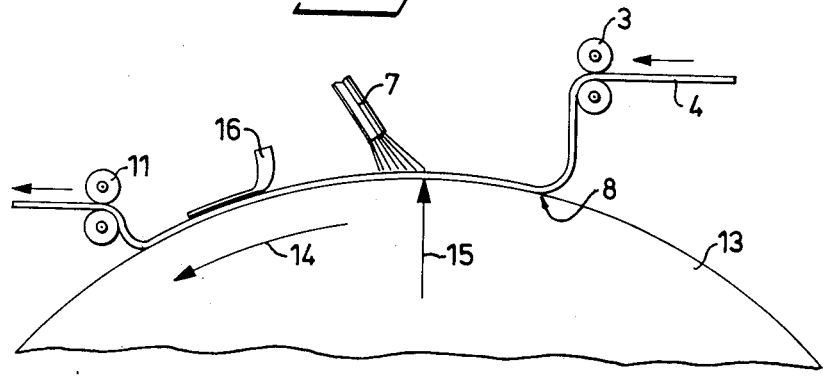

METHOD AND APPARATUS FOR CONTINUOUSLY SOLDERING OF CHAINS OF PRECIOUS METALS OR PLATED THEREWITH

BACKGROUND OF THE INVENTION

The present invention relates to a method and an apparatus for continuously soldering the abutting ends of links of chains of precious metals or chains plated with precious metals which may be manufactured by automatic soldering.

When manufacturing chains of precious metals open links with joint places abutting ends are formed, which have to be soldered together in order to increase the tensile strength of the chain. In prior known methods the chain which has not yet been soldered together used to be dipped into or drawn through a semi-liquid or powdered solder, whereupon the solder is removed from all parts except in the abutting ends. Generally the chain is then covered with a thin layer of talcum. The chain thus prepared for being soldered is thereupon moved across a heating device hanging in the vertical direction, which heating device is generally a gas heated closed box in which the chain is heated to such temperature that the solder melts and the abutting ends are soldered together.

In other cases the chain can be made of a thin tube of metal whereby solder and sometimes also fluxing material is applied in the interior of the said tube. Also in this case the soldering of the abutting ends is made in that the chain is brought to pass a heating device, whereby the solder melts and the joint ends are soldered together.

This prior known method however involves some disadvantages. When heating the chain the metal softens, especially in case of chains of silver, and it may happen that the abutting ends, depending on the weight of the chain itself and the reduced stiffness of the material caused by the heat open somewhat so that the solder does no longer fill the space between the abutting ends. Thereby an unsoldered link is obtained in the chain, which link is difficult to detect and which is an obvious risk in the rupture of the soldered chain.

In some cases there can be excess of solder in the abutting ends, and a part of the solder can flow out of the abutting ends during the soldering. Since the links hang in each other during the soldering the solder flowing out of the abutting ends may depending on the capillary forces be sucked into the area between two links so that the said links are soldered to each other.

Attempts have been made to eliminate the disadvantage that the abutting link ends open by mixing alloys into the chain metal, generally some heavy metal as e.g. cadmium which reduce the tendency of the link to open when being heated. The heavy metals however give toxic fumes which cause problems for the persons handling the metal. Attempts have also been made to eliminate the disadvantage of the above mentioned soldering of links by isolating the chain with a layer of talcum as mentioned above. Such isolation however gives a very limited protection against such soldering especially since the talcum easily loosens from the chain before and during the soldering.

BRIEF DESCRIPTION OF THE INVENTION

Basis of the invention is the problem to provide a method and an apparatus for continuously soldering the links of chains of precious metals, whereby solder in some way is applied in the abutting ends of each link, and by which method and apparatus the previously usual tension of the links is avoided, which tension has caused the opening of the links during the soldering, and in which it is possible to avoid the use of heavy metals as alloys, and in which the risk for soldering of links together is practically completely eliminated.

The method according to the invention is characterized in that the chain after having been provided with solder in the abutting ends of the links thereof is fed down onto a substantially horizontal plane with a speed which is somewhat higher than the movement of the feeding place in relation to the horizontal plane so that the links are moved somewhat into each other, and a little portion of the chain located on the plane is heated following the movement of the place where the chain is fed down in relation to the horizontal plane, whereby the chain is heated to a temperature at which the solder melts and the abutting link ends without tension of the links are soldered together. After some cooling the soldered chain can be lifted from the horizontal plane without the risk that the links open or that they become soldered together. When heating the chain in connection to the soldering the links expand, and they are free to expand in relation to each other. During the subsequent thermal shrinkage there can be some tension between the links depending on the fact that excess of solder and talcum is present between the links, and in order to eliminate this there is provided for a further movement of the links into each other after the soldering according to a modified embodiment of the above described method, so that the thermal shrinkage of the links can take place without the links acting upon each other.

Further characteristics of the invention will be evident from the following detailed description in which reference will be made to the accompanying drawings. In the drawings

BRIEF DESCRIPTION OF THE DRAWINGS

FIG. 1 diagrammatically shows a simple embodiment of a soldering apparatus according to the invention built up about a rotateable horisontal table, and FIG. 2 shows an alternative embodiment of the apparatus built up about a vertical rotateable disc.

It is to be understood that the following description and the embodiments shown in the drawings are only illustrating examples and that all kinds of modifications may be presented within the scope of the appended claims.

What is new in the invention is that the soldering of the abutting link ends of the chain is made with the chain lying substantially horisontally on a table or a disc and with the links somewhat pushed into each other. By this it is possible to completely avoid a tension of the links in relation to each other and a subsequent soldering fault, and it is possible to highly eliminate the risk of soldering of the links together in that an excess of solder cannot flow in the longitudinal direction of the chain and be sucked into the area between two links.

In practise the method according to the invention can be executed by feeding the chain down onto a substantially horisontal plane with a speed which is somewhat higher than the movement of the place of feeding the chain down in relation to the horizontal plane so that the links when contacting the said plane are pushed somewhat into each other. It is thereby possible to use a moveable means for feeding the chain down, which means is moveable along the horisontal plane or the said horisontal plane can be made moveable in relation to the means for feeding the chain down on said plane. In order to provide a continuous soldering of the chain the apparatus can be formed as shown in the accompanying drawings.

In FIG. 1 diagrammatically is shown an apparatus comprising a circular horisontal table 1 which is rotateably supported by a central shaft 2. At a place above the table a couple of feeder rollers 3 are mounted which rollers feed a chain 4 to be soldered from a bobbin 5.

The table 1 and the feeder rollers 3 are provided so as to be rotateable at a predetermined speed in relation to each other and means not shown in the drawings are provided to control the speed of the table 1 and the feeder rollers 3 in relation to each other. Such means can be a speed variator for the table or for the feeder rollers or it may be a means for moving the feeder rollers 3 in a radial direction in relation to the table. At a movement inwards to the centre 6 of the table 1 the feeding speed increases in relation to the movement of the table and at a movement radially outwards of the feeder rollers from the centre 6 of the table the feeding speed decreases in relation to the movement of the table.

The table 1 is preferably made of a material having a high thermal insulating property so that as little amount of heat as possible intended for the soldering is absorbed by the table. Preferably the table is made of a ceramic incombustible material.

The heating of the chain to soldering temperature can be made in any suitable way, e.g. in electrical or electrically inductive way. In the accompanying drawings the heating device is however shown as a gas burner which is independently disposed above the table 1 and which is turned against the moving direction of the chain. The gas burner 7 is mounted at a distance from the position 8 where the chain is put down on the table which is sufficient in order that the gas burner is not capable of acting upon the chain at the place where it is put down on the table, so that the links are moved somewhat into each other before there begins to be any substantial heating of the chain. In case of a circular table the burner 7 can suitably be mounted at an angle of about 90° from the position of contact for the chain at the table, but the said angle can be varied upon need.

When the chain is heated as it passes the burner 7 the links expand, and there may be some movement between the links. When the links have passed the burner they begin to successively cool down and during the cooling there may be some tension between the links depending on the previous movement and that excess of solder and talcum is present between the links. Before the solder has hardened and the temperature has lowered so far that such tension may occur it is therefore preferable to push the links further into each other, and in a simple way this can be made by means of a fixed mounted bar 9 which is somewhat obliquely mounted and loosely contacts the upper surface of the table 1 so as to provide a movement of the chain towards the centre of the table. Concurrently therewith the links are pushed into each other so that any tension of the links is avoided during the subsequent solidification and cooling. The mover bar 9 can be displaceably mounted in relation to the gas burner 7 and it should preferably be mounted at such an angle in relation to the burner that the solder before it is actuated by the bar 9 has had time to solidify somewhat but yet as close to the burner that there has not yet been any substantial thermal shrinkage of the chain. In a practical embodiment of the apparatus the burner 7 is mounted at an angle about 90° from the place where the chain is put down on the table and the mover bar 9 is provided at an angle of about 45° from the burner 7. Following the rotation of the table along the arrow 10 the chain is successively cooled down and finally it can be moved up from the table and by feeder rollers 11 be dropped down into a container 12 or can be wound on a bobbin. If it is wanted to speed up the cooling of the chain a blower nozzle can be provided between the mover bar 9 and the place where the chain is withdrawn from the table. From the receiver container 12 or the bobbin the chain can be successively withdrawn for any future treatment like polishing, grinding, rolling or the like.

The apparatus shown in FIG. 2 comprises a vertical disc 13 which is rotateable about a non-illustrated shaft in the direction along the arrow 14. The highest point of the disc is located at a place which is marked with the arrow 15. Also in this case the disc can be made of a ceramic material or any other material having good thermal insulating properties. The width of the disc can be varied upon need and at the periphery it may be formed with a groove or any other means for guiding the chain 4 to be soldered.

Also in the case the chain is fed by two feeder rollers 3 the speed of which is variable in relation to the peripheral speed of the disc 15 and the chain is fed down on the periphery of the disc 13 with a speed which is somewhat higher than the peripheral speed of the disc. In the same way as described above the links of the chain are thereby pushed somewhat together into each other. The chain is preferably put down at a place of the disc located somewhat in advance of the top point 15 and the angle between the said top point 15 and the point 8 where the chain is put down can be varied as wished. At some distance from the point where the chain is put down the burner 7 is mounted, and the said burner directs a gas flame at an inclined angle down against the chain 4. For further moving of the chain links into each other a sliding bar 16 can be mounted adjacent the disc 13 and which bar pushes the links somewhat into each other as the chain 4 passes the said bar. The sliding bar can be a friction bar which is sliding along the periphery of the disc 13 or it may be a roller rotating with a lower peripheral speed than that of the disc 13. For the withdrawal of the chain there is also in this embodiment provided feeder rollers 11 from which the chain is successively withdrawn for any further treatment. By putting the chain down on a substantially horisontal plane as described above and by pushing the links somewhat into each other and provide the soldering with the chain in this position it is possible to avoid any tension of the chain links and thereby it is possible to completely eliminate the risk of soldering faults depending on the fact that the abutting link ends open due to tensions between the links. It is thereby also possible to completely avoid the use of the toxic heavy metals which were previously generally present in the chain metal as an alloy, and it is also possible to practically completely eliminate the risk of soldering of links together depending on the fact that solder flows out of the abutting ends of the links and is sucked into the space between two links.

I claim:

1. Method of continuously soldering the abutting ends of links of chains of precious metals, comprising applying solder at the said abutting ends of each link, feeding and placing the said chain downwardly onto a moving substantially horizontal surface at a speed which is slightly greater than the movement of said surface whereby said links are placed on said surface and pushed into each other, heating said chain on said surface to a temperature at which said solder melts, and removing said heated chain from said surface.

2. The method of claim 1, wherein said chain is fed onto said surface by means of rotating rollers which are controllable with relation to the speed of the movement of said horizontal surface.

3. The method of claim 1, wherein said heating of said chain is conducted only at the time it is on said surface.

4. The method of claim 1, wherein said horizontal surface is part of a rotating horizontal surface.

5. The method of claim 1, wherein said horizontal surface is part of a rotating vertically disposed surface and said chain is fed onto the highest point of said vertically disposed surface.

6. The method of claim 2, wherein said links are additionally pushed together at a predetermined moment after said heating step before said solder has solidified but before there has been any substantial thermal shrinkage of the chain.

7. The method of claim 2, wherein said chain is removed from said surface after said solder has substantially cooled.

8. Apparatus for continuously soldering the abutting ends of links of chains of precious metals whereby solder is applied to said abutting ends, comprising rotatable horizontal plane means upon which said chain can be continuously placed, feed means for feeding said chain onto said plane means, said feed means having feed control means, and heating means.

9. The apparatus of claim 8, wherein said plane is a horizontal rotatable table and said feed means are rollers.

10. The apparatus of claim 8, wherein said heating means are variably disposed in relation to said feed means.

11. The apparatus of claim 8, wherein said plane is a peripheral surface of a vertical rotatable disc.

12. The apparatus of claim 8, wherein means are provided for pushing said links of said chain together.

13. The apparatus of claim 12, wherein said means are bar means.

14. The apparatus of claim 11, wherein friction means are provided for pushing said links of said chain together.

15. The apparatus of claim 8, comprising roller means for moving said chain away from said plane.

* * * * *